United States Patent [19]
Endico

[11] Patent Number: 6,013,297
[45] Date of Patent: Jan. 11, 2000

[54] DIRECT ESTERIFICATION SYSTEM FOR FOOD PROCESSING UTILIZING AN OXIDATIVE REACTION

[76] Inventor: Felix W. Endico, 444 E. 86 St., New York, N.Y. 10028

[21] Appl. No.: 09/268,514

[22] Filed: Mar. 12, 1999

[51] Int. Cl.[7] .............................. A23B 4/015; A23B 4/12; A23B 4/20
[52] U.S. Cl. ......................... 426/335; 426/17; 426/237; 426/312; 426/474; 426/589; 426/532
[58] Field of Search .............................. 426/17, 312, 474, 426/532, 237, 335, 589

[56] References Cited

U.S. PATENT DOCUMENTS

| | | |
|---|---|---|
| 4,008,333 | 2/1977 | Izumi . |
| 5,173,318 | 12/1992 | Leu et al. . |
| 5,403,602 | 4/1995 | Endico . |
| 5,439,556 | 8/1995 | Sethna et al. . |
| 5,858,430 | 1/1999 | Endico . |

FOREIGN PATENT DOCUMENTS

| | | |
|---|---|---|
| 206536 | 8/1987 | Japan . |
| 249985 | 3/1991 | Japan . |

*Primary Examiner*—Helen Pratt
*Attorney, Agent, or Firm*—Natter & Natter

[57] ABSTRACT

A direct esterification system for food processing utilizing an oxidative reaction. Ozonated water and peracetic acid are combined and oxidatively react with food sauce constituents to form esters that provide desired flavor and olfactory characteristics. The oxidative reaction simultaneously disinfects the food constituents and provides requisite acid and moisture components to the finished food product.

15 Claims, 2 Drawing Sheets

DIRECT ESTERIFICATION SYSTEM FOR FOOD PROCESSING UTILIZING AN OXIDATIVE REACTION

CROSS-REFERENCE TO RELATED APPLICATION

This application is related to pending application Ser. No. 09/095,393 for a Food Disinfection and Preservation Treatment Utilizing an Oxygen-Potentiated Acidulant.

BACKGROUND OF THE INVENTION

1. Field of the Invention

The invention relates generally to food processing and especially to food flavor chemistry.

In particular, this invention concerns the direct conversion of a food into an ethereal salt.

2. Background Art

Ethereal salts, more commonly known as esters, are formed during the manufacture of food products by fermentation. Esters impart aromatic and flavor characteristics to foods and are critical to consumer taste acceptance.

The fermentation procedure involves the chemical conversion of organic food substances by the action of ferments, such as enzymes produced by molds, bacteria and yeast. Typically, food is inoculated with selected enzymes and, over a period of time, the enzymes breakdown the food to form carbon dioxide and other products, such as alcohol. For example, in alcoholic fermentation, the action of zymase, secreted by yeast, converts simple sugars, such as glucose and fructose, into ethyl alcohol and carbon dioxide. The reaction of an organic acid with alcohol leads to the formation of an ester.

In the process of esterification, the hydroxyl group of the acid combines with the hydrogen atom of the hydroxyl radical in the alcohol to form water, the other product being the ester. These reactions are nonionic and therefore proceed very slowly. An equilibrium state is established only when sufficient time has been allowed to elapse.

A disadvantage of this esterification procedure is that a delayed-action or "aging" of the food product is required in order to reach equilibrium. For example, some food products must be "aged" for several years. Consequently, the production cycle-time and the related cost factors are adversely affected by the time lapse.

An attempt to accelerate the rate of esterification and aging of distilled liquor is disclosed in U.S. Pat. No. 5,173, 318; however, the procedure described does not eliminate the intermediate fermented product.

Another shortcoming with the formation of esters by a fermentation procedure is that the aging must be maintained under controlled conditions of temperature and acidity that require continuous monitoring. Additionally, when the food product is fully aged, it must then be pasteurized to eliminate microbes present in the enzymes. A problem with this thermal treatment is that it indiscriminately destroys both desirable and undesirable microbes. Certain microbes are beneficial in that they provide an enzymatic action for tenderizing meat and poultry and preferably should remain in certain food products, for example, in steak sauces. Other drawbacks inherent in food pasteurization is the deterioration of flavor and the detrimental alteration of nutritional value. Another limitation of the fermentation procedure is that the food product must be clarified to remove impurities that become entrained during fermentation and to improve the translucity of the product so as to receive favorable consumer acceptance.

BRIEF SUMMARY OF THE INVENTION

Briefly, the nature of this invention concerns a direct esterification system for food processing utilizing an oxidative reaction. The synthetical esterification procedure of this invention does not require a fermented precursor. The direct esterification system further does not rely upon a displacement of the equilibrium point for accelerating the rate of esterification.

The general concept of the direct esterification system of this invention involves the production of an ozone-enriched water, such as ozonated water and an oxygen-potentiated acidulant, such as peracetic acid. A pre-mix of food constituents is contacted with the ozonated water and the peracetic acid for a predetermined duration. The oxygen released upon decomposition of the ozonated water and the peracetic acid effectively oxidizes the food constituents to form alcohol. The peracetic acid also decomposes to form acetic acid. The alcohol reacts with the acetic acid to produce esters that provide a flavor source.

A feature of this direct esterification procedure is that the oxidative reaction releases free oxygen radicals and hydroxyl ions that provide simultaneous disinfection of the food constituents. This reduces reliance upon food preservatives for maintaining and extending shelf-life of the product. Furthermore, the residual oxygen liberated during oxidative decomposition typically meets governmental requirements as promulgated under the Generally Recognized As Safe Standards (GRAS) of the F.D.A.

Other advantages of the direct esterification system of this invention is improved process control, reduction of cycle-time and the maintenance of microbial activity.

Having thus summarized the invention, it will be seen that it is a preferred object thereof to provide a direct esterification system for food processing utilizing an oxidative reaction that is not subject to the limitations of the background art.

A preferred object of this invention is to provide a direct esterification system for imparting desirable flavor and/or aromatic characteristics to a food product within a relatively short time frame.

Another preferred object of this invention is to provide a direct esterification system wherein food constituents are esterificated without fermentation.

An additional preferred object of this invention is to provide a direct esterification system utilizing an oxidative reaction for providing simultaneous food disinfection.

A further preferred object of this invention is to provide a direct esterification system wherein the food constituents are not subjected to heat treatment.

Yet another preferred object of this invention is to provide a direct esterification system capable of sustaining beneficial microbial activity.

With these ends in view, the invention finds embodiment in a procedure by which the aforementioned preferred objects and certain other preferred objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown an exemplary procedure in accordance with the principles of this invention.

DETAILED DESCRIPTION OF THE INVENTION

With specific reference now to the drawings, it is stressed that the particulars shown and described herein are for the purpose of illustrative discussion of the process of this invention and are presented in the cause of providing what is believed to be the most useful and readily understood description of the principles and conceptual aspects of this invention.

In this regard, no attempt has been made to show the process in more detail than is necessary for a fundamental understanding of the invention however, the description, in combination with the drawings, should make apparent to those skilled in the art how the process may be applied in practice.

For the purpose of this illustrative embodiment, the invention will be described with reference to the manufacture of a food sauce such as a soy sauce, Worcestershire sauce, or barbecue sauce, with each sauce having an acidulant component, such as vinegar.

Figure 1:
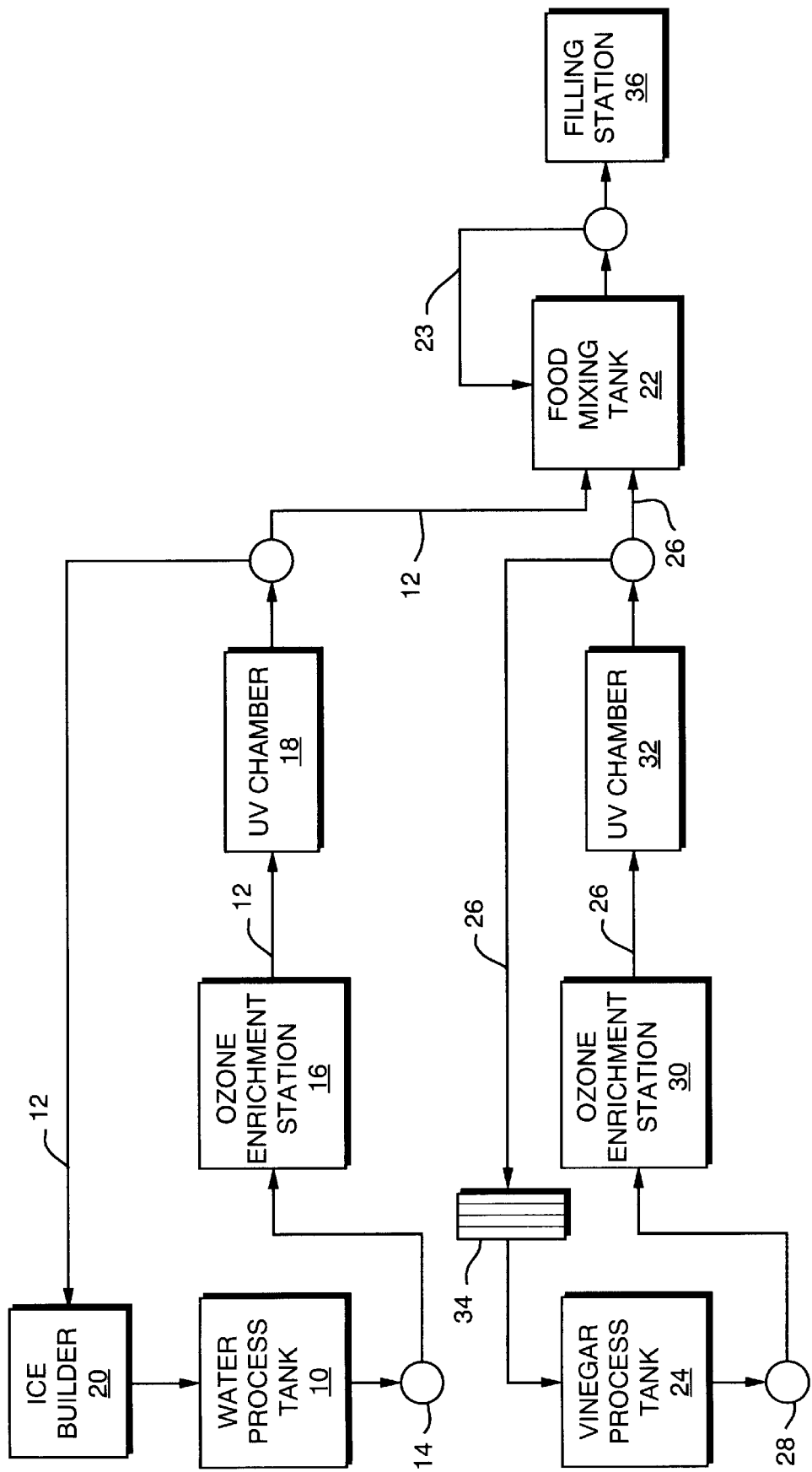
FIG. 1 is a schematic diagram illustrating an apparatus and procedure for implementing the direct esterification system of this invention.

The initial stage of the process involves the production of ozone-enriched water following a protocol similar to that described in U.S. Pat. No. 5,858,430. The procedure for ozonating the water will now be detailed with reference to FIG. 1. It should be understood that ozone, hydrogen peroxide, or a combination of both substances may be utilized with or without a catalyst accelerant although for the purposes of the description reference will be made only to ozone gas.

A charge of fresh water e.g., tap water, is supplied to a process tank 10. The water is recirculated through a conduit network 12 utilizing a pump 14. By way of example, the tank 10 is typically a 400 gallon stainless steel vessel. The vessel is optionally jacketed to provide for circulation of an iced brine solution or a freon gas to pre-chill the water. The conduit network 12 is preferably silicon sanitary tubing having sanitary couplings and valves for providing a bacteria-free fluid transfer. The pump 14 is typically a sanitary centrifugal pump having a discharge rate of 10–20 gallons/minute.

The water is circulated through an ozone enrichment station 16 wherein ozone gas is aspirated through a venturi nozzle into the circulating water. A typical ozone gas discharge rate of 6 liters/minute has been found effective for this purpose. The optimum concentration of dissolved ozone gas in water is typically between 0.3 to 0.7 parts per million (ppm).

The water is next circulated through an ultraviolet (UV) irradiation chamber 18 typically employing an in-line UV lamp with a wavelength at around 2000–3000 Angstrom units (200–300 nanometers). The photoluminescence provided by the UV chamber 18 provides a disinfecting action and is also believed to improve the oxidizing efficacy due to hydroxyl formation.

The water is thereafter selectively recirculated to the process tank 10 however, the circulating water is first passed through an ice builder 20 for lowering the temperature of the water to approximately 32° F.–40° F. The lowered temperature improves the ozone concentration. The ice builder 20 can, for example, be an ice making apparatus, such as manufactured by The Manitowoc Company, Inc. of Manitowoc, Wis.

The ozone concentration and water temperature are preferably continuously monitored. When the targeted parameters have been achieved, the ozonated water is ready for food treatment and is directed to a food mixing tank 22.

The procedure for providing the oxygen-potentiated vinegar will now be described. A food-grade vinegar is selectively dispensed from a process tank 24 for circulation through a conduit network 26. A corrosion-resistant pump 28 is effective for this fluid transfer application. The circulating vinegar is passed through an ozone enrichment station 30. Ozone gas is infused in the vinegar in a manner similar to that described with regard to the ozone enrichment of the water. A dissolved ozone concentration of between approximately 0.3 to 0.6 ppm of vinegar has been found effective for converting the acetic acid within the vinegar to peracetic acid. The peracetic acid is next transferred through an ultraviolet (UV) irradiation chamber 32. The peracetic acid is subjected to UV irradiation at wavelengths at approximately 200–300 nanometers (nm). This UV irradiation level boosts and maintains the ozonation of the peracetic acid and promotes the formation of synergistics radicals, such as hydroxyl oxidizers. Additionally, the UV irradiation provides germicidal properties and is known to destroy the microorganisms' DNA molecules. The oxygen-potentiated vinegar is then directed for continuous recirculation to the process tank 24 to achieve and maintain targeted ozone absorption levels.

The process tank 24 is designed for chemical corrosion resistance and can typically have a fiberglass liner or 316 stainless steel construction, in accordance with F.D.A. sanitary standards. In this illustrative embodiment, the tank 24 has a capacity of 100 gallons.

The temperature of the oxygen-potentiated vinegar is lowered, typically by a plate chiller 34 such as a flow-through refrigeration chiller, (as for example is manufactured by Chester-Jensen Co., Inc., Chester, Pa.) prior to discharge in the process tank 24; the temperature is preferably maintained at approximately 40° F.

When the optimum parameters of ozone concentration and temperature have been achieved, the oxygen-potentiated vinegar is discharged to the food mixing tank 22 as needed for food production.

The contents of the food mixing tank 22 are recirculated through a conduit 23 until desired levels of acidity and pH values have been reached. The contents are then directed to a filling station 36 for packing.

Figure 2:
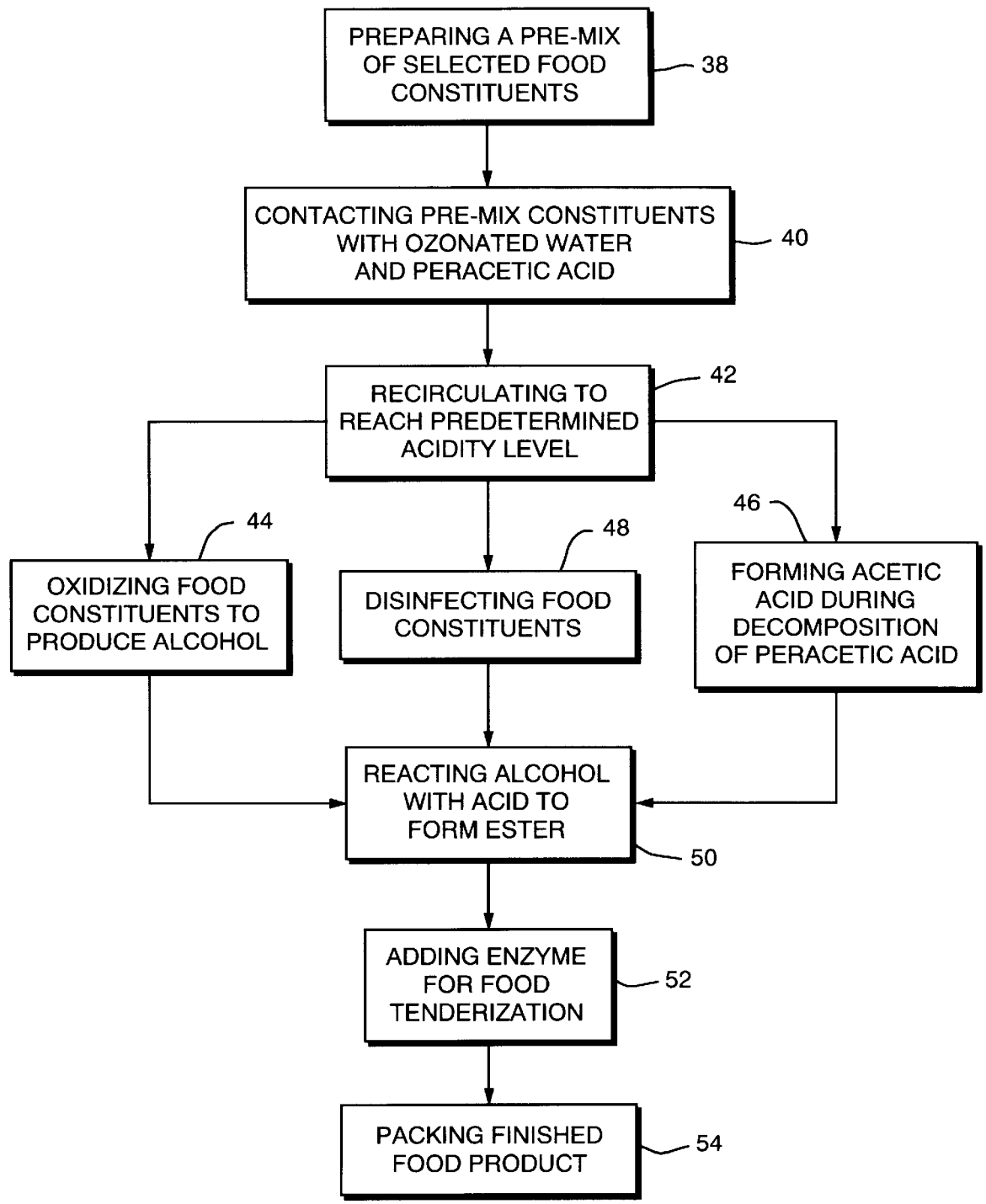
FIG. 2 is a flow diagram illustrating a food processing sequence in accordance with the direct esterification system of this invention.

The direct esterification system of this invention will now be discussed with reference to FIG. 2. The processing sequence as illustrated, will be described as applied to the production of a food sauce having an acidulant component, such as soy sauce or Worcestershire sauce.

The initial phase involves the preparation of a pre-mix of selective food constituents, for example, hydrolyzed vegetable protein, spice mix, molasses, caramel color, flavor extracts and salt. This step is denoted by the numeral 38.

The pre-mix constituents are placed in the mixing vessel 22 and a charge of ozonated water, preferably containing about 0.6 ppm dissolved ozone gas, at a temperature of about 40° F. is supplied to the mixing vessel 22 for contacting the pre-mix food constituents as denoted at 40. Concurrently, the peracetic acid, at a temperature of about 40° F., is also added to the mixing vessel 22 for contacting the pre-mix constituents as shown at 40. The pre-mix food constituents are mixed within the vessel 22 until reaching an acidity level of not less than 0.5% by volume and a pH (hydrogen ion concentration) of less than 3.8. This is implemented by a continuous recirculation shown as step 42.

During the contacting stage, oxygen will be released from the ozonated water for oxidizing the food constituents as shown at 44. The oxidation reaction time is approximately 5–15 minutes from initial food contact; thereafter the ozonated water will revert back to water and oxygen. The interaction of the ozone with peroxidase or catalase enzymes, that occur naturally in some spices and vegetable proteins, will act as an accelerant to decrease the oxidation reaction time. It should also be noted that the pre-mix is adjusted for the water component derived from the decomposed ozonated water.

The peracetic acid is unstable and will revert to acetic acid and liberate oxygen during pre-mix contact. This step is shown at reference numeral 46. The pre-mix constituents are adjusted for the acetic acid component, being an ingredient in the finished food sauce.

Furthermore, a disinfecting action occurs with the release of oxygen, both from the ozonated water and the peracetic acid, which is effective for oxidizing bacteria, viruses and other pathogens that may be present in the pre-mix. This disinfecting step is indicated at 48.

A desired taste and/or aroma is imparted in the mixed food constituents by the reaction of the acetic acid and alcohol to form esters denoted as step 50. The formation of the esters should be completed within about 5–15 minutes. It is believed that the amino acid in the food proteins are directly oxidized and that free radical oxygen bonds with hydrocarbon and nitrogen structures resulting in dehydration synthesis required to form the acid-alcohols.

As previously noted, the process does not include thermal pasteurization. Therefore, desirable enzymes such as proteinase and lipidase can optionally be added to the food ingredients at step 52. These enzymes are effective for tenderizing meats and poultry.

The final step 54 of the operation is packing of the finished food sauce. The food sauce produced by the method so described is both enzyme-rich for tenderizing meats and poultry and has favorable flavor and aroma characteristics for use as a condiment.

It should thus be seen that there is provided a direct esterification system for food processing utilizing an oxidative reaction which achieves the various preferred objects of this invention and which is well adapted to meet conditions of practical use.

Since other possible variations of the treatment process described herein might be made to the exemplary form set forth, it is understood that the process as shown and described should be interpreted as illustrative and not in a limiting sense.

Having thus described the invention, there is claimed as new and desired to be secured by letters patent:

1. A direct esterification system for food processing used for the manufacture of a food sauce having an acidulant component comprising the steps of:
   a) preparing a pre-mix of a selected food constituents consisting essentially of hydrolyzed vegetable protein, spice mix, molasses, caramel color, flavor extracts and salt;
   b) contacting the pre-mix constituents with ozone-enriched water and with an oxygen-potentiated acidulant;
   c) oxidizing the sugar found in the food constituents by release of oxygen from the ozone-enriched water to form an alcohol;
   d) forming an acid by decomposition of the oxygen-potentiated acidulant;
   e) reacting the alcohol with the acid to form an ester for providing a desired food flavoring; and
   f) utilizing the residual acid as a component in the finished food sauce.

2. A direct esterification system for food processing as claimed in claim 1 including the further step of:
   g) packing the finished food sauce.

3. A direct esterification system for food processing as claimed in claim 1 including the further step of:
   recirculating the pre-mix constituents after contact with the ozone-enriched water and oxygen-potentiated acidulant until a predetermined pH level has been reached.

4. A direct esterification system for food processing as claimed in claim 3 wherein the predetermined pH level is less than 3.8.

5. A direct esterification system for food processing as claimed in claim 1 wherein the food constituents are contacted with the ozone-enriched water and the oxygen-potentiated acidulant for a time duration of approximately between 5 and 15 minutes.

6. A direct esterification system for food processing as claimed in claim 1 including the further step of:
   disinfecting the food constituents concurrently with the oxidizing step.

7. A direct esterification system for food processing as claimed in claim 1 including the further step of:
   f) adding optional enzymes for food tenderization.

8. A direct esterification system for food processing as claimed in claim 1 wherein the ozone-enriched water is subjected to UV irradiation.

9. A direct esterification system for food processing as claimed in claim 8 wherein the ozone-enriched water is maintained at a temperature of approximately between 32° F.–40° F.

10. A direct esterification system for food processing as claimed in claim 1 wherein the ozone concentration in the ozone-enriched water is approximately between 0.3 to 0.7 ppm.

11. A direct esterification system for food processing as claimed in claim 1 wherein the pre-mix of food ingredients is adjusted to compensate for moisture gain upon decomposition of the ozone-enriched water.

12. A direct esterification system for food processing as claimed in claim 1 wherein the oxygen-potentiated acidulant is peracetic acid.

13. A direct esterification system for food processing as claimed in claim 12 wherein an acidulant component of the finished food product is vinegar.

14. A direct esterification system for food processing as claimed in claim 12 wherein the ozone concentration within the peracetic acid is approximately between 0.3 to 0.6 ppm.

15. A direct esterification system for food processing as claimed in claim 12 wherein the peracetic acid is maintained at approximately 40° F.

* * * * *